(12) United States Patent
Swanson

(10) Patent No.: US 8,317,520 B2
(45) Date of Patent: Nov. 27, 2012

(54) SYSTEMS, METHODS AND APPARATUS FOR IDENTIFICATION AND EVALUATION OF INNOVATIVE ABILITIES

(76) Inventor: Daniel Raymond Swanson, Midlothian, VA (US)

( * ) Notice: Subject to any disclaimer, the term of this patent is extended or adjusted under 35 U.S.C. 154(b) by 512 days.

(21) Appl. No.: 12/433,099

(22) Filed: Apr. 30, 2009

(65) Prior Publication Data

US 2010/0279267 A1 Nov. 4, 2010

(51) Int. Cl.
*G09B 7/00* (2006.01)
(52) U.S. Cl. ........ 434/323; 434/322; 434/336; 434/350; 434/362
(58) Field of Classification Search .................. 434/322, 434/323, 350, 362, 335, 336, 353
See application file for complete search history.

(56) References Cited

U.S. PATENT DOCUMENTS

| | | | |
|---|---|---|---|
| 2003/0033295 A1* | 2/2003 | Adler et al. | 707/3 |
| 2003/0187706 A1* | 10/2003 | Buchmiller et al. | 705/7 |
| 2004/0014016 A1* | 1/2004 | Popeck et al. | 434/322 |
| 2004/0043372 A1* | 3/2004 | Jebb et al. | 434/322 |
| 2004/0107131 A1* | 6/2004 | Wilkerson et al. | 705/10 |
| 2004/0267607 A1* | 12/2004 | Maddux | 705/11 |
| 2005/0235252 A1* | 10/2005 | Knight | 717/104 |
| 2005/0267807 A1* | 12/2005 | Bentley, III | 705/14 |
| 2006/0084046 A1* | 4/2006 | Brown et al. | 434/236 |
| 2006/0177808 A1* | 8/2006 | Aosawa et al. | 434/322 |
| 2007/0178432 A1* | 8/2007 | Davis et al. | 434/353 |
| 2007/0196798 A1* | 8/2007 | Pryor et al. | 434/236 |
| 2007/0276675 A1* | 11/2007 | Gabrick et al. | 705/1 |
| 2008/0281616 A1* | 11/2008 | Johnson | 705/1 |
| 2009/0177665 A1* | 7/2009 | Callery et al. | 707/100 |

* cited by examiner

*Primary Examiner* — Xuan Thai
*Assistant Examiner* — Bruk Gebremichael

(57) ABSTRACT

A system, method and apparatus measures and classifies innovation skills and technical capability of individuals based on predefined referencable attributes. The classification is used to help individuals improve their innovative abilities and to build innovation teams. The classifications are stored such that they may be further analyzed and used.

15 Claims, 10 Drawing Sheets

| Profile | Profile Values |
|---|---|
| P = Power | Getting things done quickly |
| R = Relationship | Getting everyone together |
| I = Ingenuity | Cleverly solving a problem |
| D = Details | Ensuring accuracy |
| E = Evenness | Ensuring team success |

Figure 8

SYSTEMS, METHODS AND APPARATUS FOR IDENTIFICATION AND EVALUATION OF INNOVATIVE ABILITIES

BACKGROUND

Identifying and selecting the best individuals for a given task has been an important aspect of all societies since the beginning of recorded history. Every leader wants to have confidence that his or her team members are well suited for the task at hand. Historically, leaders with an important task have tried to select individuals or team members using resumes, personal interviews or sometimes even gut feel. Sometimes leaders get it right and select individuals or team members that perform well. Sometimes leaders get it wrong and select the wrong people. When a leader makes the wrong selection, money can be lost, time can be lost, and in the worst case lives can be lost.

With so much at stake leaders are continually trying to refine their ability to select the right person for the right task or project. As leaders have found, different tasks require different individuals or different teams. This is primarily because individuals and team members often need to have more than one set of skills to be successful at any given task, project or activity. Successful individuals and team members need to have certain personality skills, so that they may effectively work with others. Individuals and team members may also need to have technical skills in specific areas that will help them more effectively complete the task, project or activity. Historically, tools to identify an individual's personality have existed. These tools go back to the time of the ancient Greeks. Hippocrates around 400 B.C. first suggested that individual behaviors (personalities) were caused by 4 body fluids that he called humors. Approximately 200 years later Galen described 4 temperaments too. Use of these theories with various revisions carried right up until the 20$^{th}$ Century. In the last century many different researchers developed similar tools to try to explain individual variances in personality and behavior. The DiSC profile is another example of a personality profile. It was developed based on the work of William Moulton Marston. It uses four personality profile aspects. The Myers-Briggs type indicator was also developed in the last century. It was based on the theories of Carl Jung. The Myers-Briggs tool has 16 categories for classification of individual personalities. There are many more classification tools that have been developed over the years. Many of these personality profile tools use a four personality classification model that is similar to the personality profiles that were developed by the ancient Greeks. However, these tools all lack the ability to identify an individual's personality, which when coupled with the individual's level of technical skill, can help drive innovation success.

BRIEF DESCRIPTION OF THE DRAWINGS

FIG. 8 illustrates a high level overview of the 5 components of an individual's personality profile;

DETAILED DESCRIPTION

Figure 1:
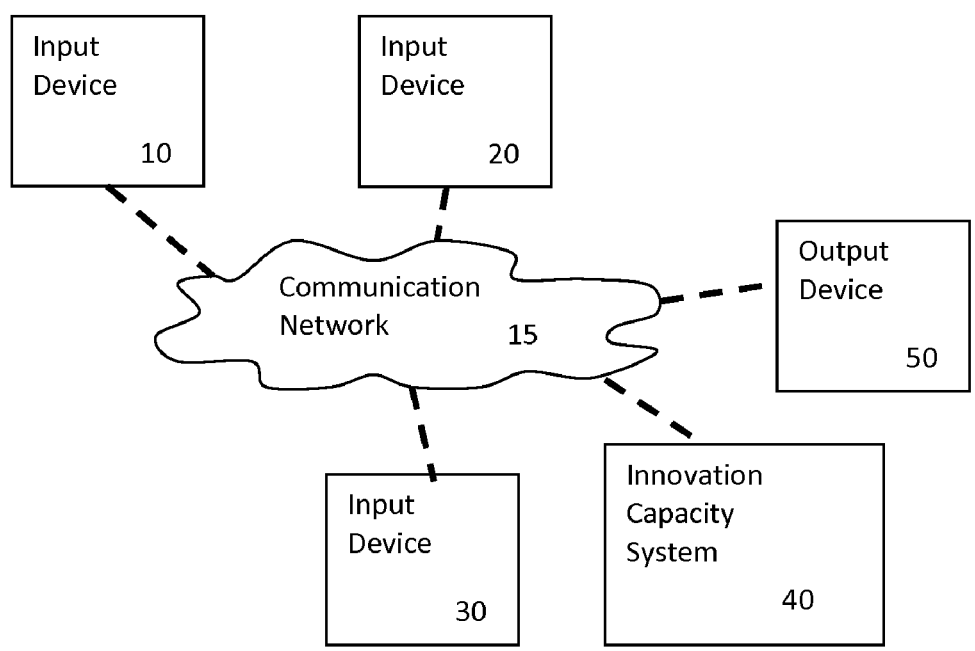
FIG. 1 illustrates a system environment in accordance with an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The software may be executed on a plurality of digital signal processors.

Various embodiments relate to innovation measurement and innovation capacity determination, that may utilize many different media, including, but not limited to, pen and paper, sound or visual image, music, motion pictures, radio and television broadcasting, a network, and the internet. More particularly, the invention relates to apparatus, systems and methods for identifying, valuing, rating, measuring, reporting and improving on the innovation capacity of individuals.

Various embodiments of the invention may be used in one or a plurality of innovation projects, including but not limited to projects to: design a new process, redesign an existing process, decrease costs, increase revenues, create new product and services, improve on existing products and services, invent new apparatus. Various embodiments may be used to build manage and reward teams. Various embodiments may be used to build manage and reward individuals.

Presently there is no known way to help a leader identify the best possible team members, or individuals, for an innovation project based on personality and technical ability. As a result leaders may not select the most optimal people for an innovation effort. A great number of innovations come from individuals working together collaboratively. If a leader has no known system, method or apparatus that will help ensure that the best individual, or the best individuals, will be selected for a team, an innovation may be suboptimal. A new product or service created may be suboptimal.

Identification, valuation, rating, measuring, reporting and improving on the innovation capacity of individuals benefits both the individual, and the organization for which the individual innovates.

The individual benefits by a better understanding of his or her innovative capacity. This may help the individual indentify opportunities where he or she may be more successful innovating. This is because different innovation opportunities require different skill sets for success. For example an individual with an innovation personality that is oriented toward "Power" may have difficulty improving a process for which he is the manager. Another individual who has an innovation personality that is oriented toward "Details" may find it easier to improve upon a process that they personally manage.

The organization benefits by being able to more effectively select the right individual and match the right individual to the right effort. This diminishes the potential problems that may arise from the innovation effort. The types of problems that may be avoided include, but are not limited to, personality conflicts between team members, assignment of suboptimal personal to an innovation effort, assignment of the incorrect mix of individuals to an innovation effort, assignment of too many people with similar innovation profiles to an innovation effort, innovation projects that take too long to complete, go over budget, do not meet improvement objects, or even completely fail. This invention helps ensure the success of innovation efforts by better enabling the selection of the right individuals for the right innovation project.

Successful, efficient innovation efforts also help society at large, by enabling enhancements to, or enabling the invention of, products, processes and services that help improve the quality of life for people. With all the advantages of improving the efficiency and output from innovation efforts, it is clear that a system method and apparatus that helps facilitate innovation would be very valuable.

Some embodiments may identify and analyze the potential needs of the innovation effort, including the creation of special questions to help identify the best individuals for a given innovation effort. Some embodiments may use a different set of innovation identification questions for each individual innovation effort. For example, one skilled in the art will see that if in some embodiments, there are 100 unique innovation efforts; there may be 100 different sets of innovation identification questions.

An embodiment may be a system, method and apparatus which provide for the creation of tailored innovation identification questions. For brevity, the system and method and apparatus that that enables innovation measurement and innovation capacity determination, will be referred to as "The instrument". The instrument may comprise a series of created questions which may be individually weighted. In an embodiment the questions themselves may have individual weightings. For example, "question 1" may be worth five points, "question 2" may be worth 15 points, "question 3 may be worth seven points, and so forth. The valuation of each question may be varied as is appropriate to adequately weight questions that may be more valuable for identifying and creating an optimal innovation effort.

An embodiment may provide for the creation and weighting of tailored answers to questions. These tailored and weighted answers may be combined with other tailored answers. For example, in an embodiment the answers to question 1 may be weighted: 5 points for "answer a", 8 points for "answer b", 12 points for "answer c", 3 points for "answer d", 0 points for "answer e". In an embodiment, there may be no limits to the combinations of answer valuations that are possible.

In an embodiment, questions may have a valuation and answers may have a valuation. For example, in an embodiment, question 1 is worth 10 points and "answer a" for question 1 is worth 5 points, "answer b" for question 1 is worth 10 points, "answer c" to question 1 is worth 8 points. For example, in an embodiment the answer value may be additive to the valuation of the question. In another embodiment the answer value may be multiplied by the valuation of the question. In yet another embodiment the value of the question may be divided by the value of the answer, or the value of the answer may be divided by the value of the question. In another embodiment the value of the question may be subtracted from the value of the answer or the value of the answer may be subtracted from the value of the question. There is no limit to the potential mathematical functions, or combinations of functions, that may be applied to the questions and answers. These may include but are not limited to, addition, subtraction, multiplication, and division. An embodiment may include a plurality of mathematical actions, and combinations of actions, on each and every one of the different questions utilized in an innovation identification system, method and apparatus.

In an embodiment, a plurality of innovation measurement and innovation capacity determination inputs is brought together with a communication network. Using these inputs, a valuation for each innovation question and answer, or combination of question and answer is created. The questions and answers may be categorized by calculated value and are then stored either locally or remotely to the user's output device, as content is delivered to the device, the innovation measurement and innovation capacity determination system selects and places appropriately valued questions in appropriate slots in the content. Results of question placement are then gathered, reported and consolidated to document the tailored questions. Various embodiments are designed to help ensure users will receive questions and answers that are valuable to the potential innovation effort.

Further features and potential advantages as well as the structure of operation of various embodiments are described in the following text which includes detailed descriptions and figures.

It is to be understood that both the foregoing general descriptions and the following detailed description are examples and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

A description of the various embodiments follows. As an overview, embodiments of the systems methods and apparatus for innovation measurement and innovation capacity determination (The instrument) consistent with the present invention, take inputs from one or a plurality of sources. These inputs are used to determine an appropriate valuation of the questions and answers for the individual innovation project. This valuation may then be used to categorize the questions or answers into one or a plurality of valuation groups. For each innovation effort, questions and answers are delivered to the user, questions and answers from the valuation groups are placed at appropriate points. As the user begins using "the instrument" the results from this tailored question and answer placement are gathered, processed and stored to facilitate reporting to administrators, innovation project executives, and/or users. In one embodiment, a user may share information from innovation measurement and innovation capacity determination system with consultants. This sharing would generally be as a result of the users desire to have assistance in improving his or her innovative skills and abilities. Sharing may also be for whatever other personal reason the user may have.

The system can be implemented over a variety of multimedia networks with large populations of network devices including but not limited to: televisions, television cable, satellite and set top boxes, game consoles, cell phones, portable data access devices, email, computers, radio, and other network apparatus or appliances.

FIG. 1 illustrates an example communication network that allows for a plurality of input devices to communicate. Such a network may be a wired network or a wireless network. Input device 10 may be a laptop or desktop computer that enables a user to respond to system or method generated questions and answers. Input device 20 may be one or a plurality of innovation effort content providers that supply input. Communication Network 15 enables a plurality of input devices to communicate. Input device 30 represents a plurality of additional possible input devices, which include but are not limited to, television or set-top TV box remote controls, satellite remote controls, cell phones, telephones, Personal Digital Assistants, or any other wireless or wired device that has the ability to make selections and link to a network. Innovation capacity system 40 gathers information from one or a plurality of input devices, calculates a valuation for each question and/or answer, selectively places questions and answers within a content framework at an appropriate spot. The placement of the questions and answers is recorded. Metrics on question and answer placement are reported as appropriate. Output device 50 is the device by which the questions, answers, results and representations are experienced (i.e. viewed for television, heard for radio etc.) These placements may be within another program. A computer may be used as an output device.

Figure 2:
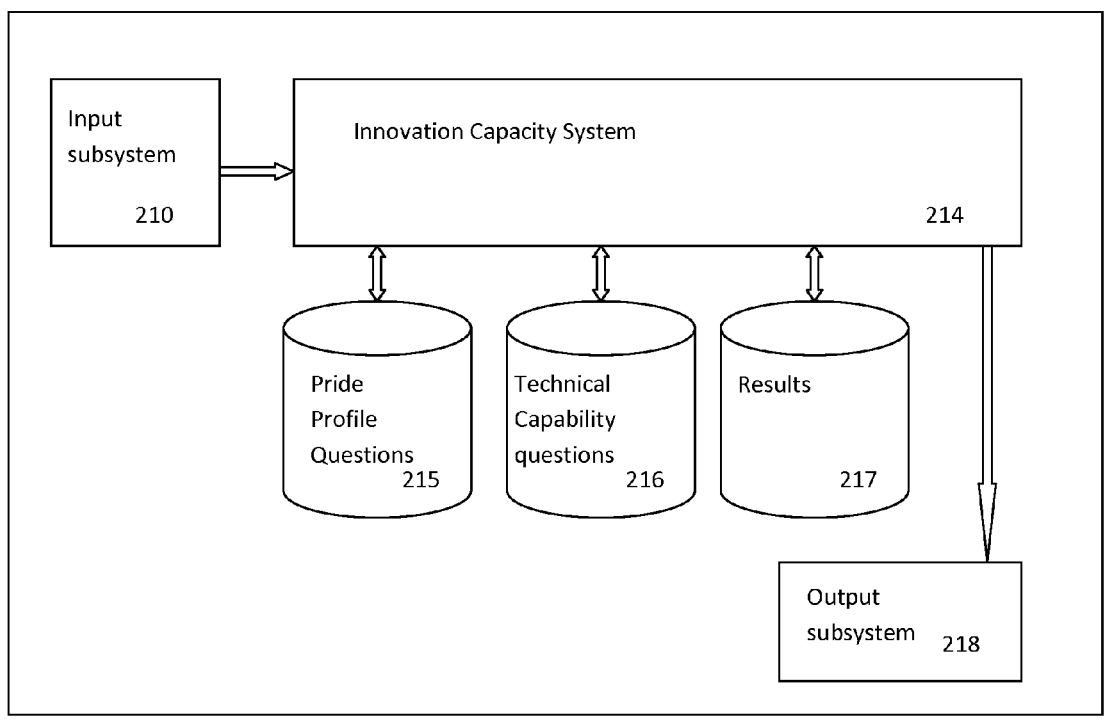
FIG. 2 illustrates a block diagram for determining the innovation capacity of an individual.

FIG. 2 illustrates the components used by the innovation measurement and innovation capacity determination system (Innovation Capacity System) 214. Input Subsystems 210 may be at least one of the following, a keyboard, a website, a phone, a remote control device, a broadcast signal, a satellite feed, a cable TV feed, a Virtual Private Network (VPN), a Bluetooth device, a personal digital assistant PDA, a Voice activated response (VAR) system, Voice Response unit (VRU), a cellular or mobile phone voice system, a cellular or mobile phone Short Message Service (SMS) system.

These inputs may come from diverse and even encrypted sources. Innovation Capacity System 214 decodes them into a format usable by the Innovation Capacity System 214. The Innovation Capacity System 214 values the questions and answers using the Innovation Calculation Module 425 (FIG. 4), and places the valued questions and answers appropriately in Pride Profile questions 215 or Technical Capability questions 216.

Innovation Capacity System 214 content is then presented to output subsystems 218 which may include but are not limited to, television monitors, radios, computer monitors, PDA's, computer projectors, emails, cell phone screens, phone screens.

As a user interacts with Innovation Capacity System 214, results are gathered from the user's responses to questions and answers and are sent to Results 217. Results may be tabulated in real time or may be tabulated in batch. Innovation Capacity System 214 may report information to users, management or others from Results 217 as appropriate.

Figure 3:
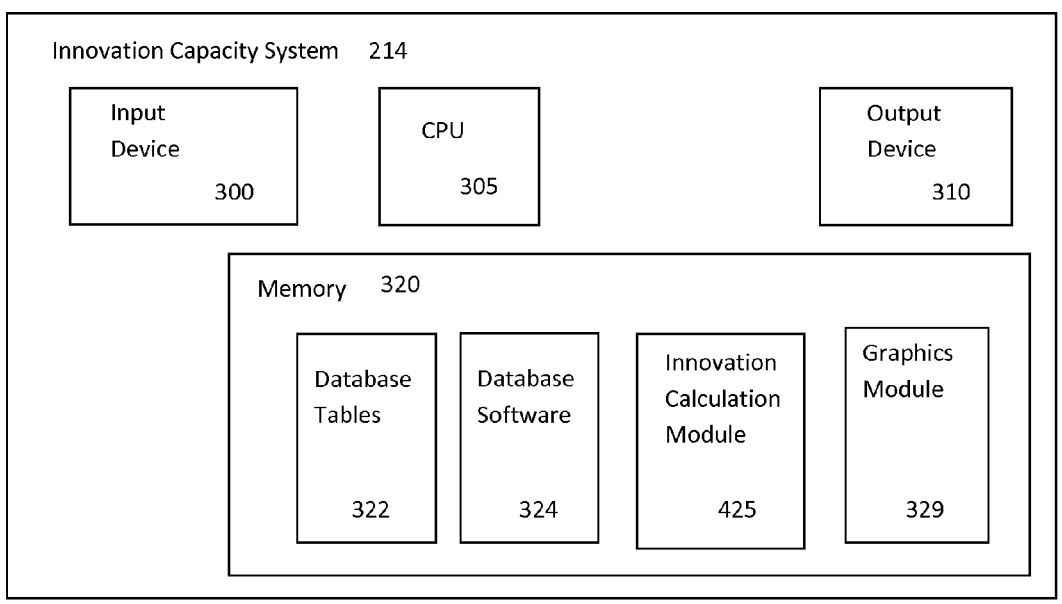
FIG. 3 illustrates an example innovation measurement and innovation capacity determination system.

FIG. 3 illustrates the detailed components of the Innovation Capacity System 214, which may include real time decision making and placement of valued and tailored questions and or answers in content. In one embodiment, questions and answers are received ahead of content delivery, valued, processed and stored by the Innovation Capacity System 214, In another embodiment, tailored questions and answers are stored locally but not directly within the Innovation Capacity System 214. An example where this may be appropriate would be when a set-top box is retrofitted to implement an embodiment, but said set-top box does not have the significant amounts of memory needed to store questions and answers. In this case, storage of questions and answers may be on multi-media computer that has a connection to the Innovation Capacity System 214. When the Innovation Capacity System 214, is enabled the questions and answers are passed to the set-top box for display on the television screen.

FIG. 3 is a block diagram illustrating an exemplary Innovation Capacity System 214, consistent with the principles of the present invention. Innovation Capacity System 214 may be any general-purpose computing system using Linux, Unix, Windows, Apple or any operating system In any case, such a system may have at least one Input Device 300 which may include network interfaces, keyboards, mice, speech recognition devices, or document, video, or image input devices remote control devices, a broadcast input interface, a satellite input interface, a cable TV input interface. Additionally, Innovation Capacity System 214 may have at least one output device 310, such as, display devices, network interfaces, printers, or sound or speech output devices.

At least one central processing unit ("CPU") 305 will be used in Innovation Capacity System 214. CPU 305 may execute software programs for implementing the processes described below with respect to FIG. 9. One skilled in the art will appreciate that although FIG. 3 shows one CPU, multiple CPUs may execute the Innovation Calculation Module 425 and the Graphics Module 329, along with the Database Software 324, and Database tables 322. The Innovation Calculation Module 425 processes the various inputs, determines the value questions and or answers, and then places questions and answers in appropriate categories. The invention's scoring is unlimited and questions and answers may even scored by unique discreet calculated valuation, (i.e. Ques.1=107, Ques.2=103, Ques.3=103, Ques.4=102, Ques.5=99, etc.).

When a user begins an innovation measurement and innovation capacity determination session, the Innovation Calculation Module 425 evaluates the potential innovation area under consideration and then places an appropriately valued question and answers tailored for the innovation area under consideration in an appropriate location.

Memory 320 may also contain question and answer placement details such as date and time of placement, final question and answer valuation. Innovation Calculation Module 425 may also consolidate results and calculate measures and results as needed to provide adequate feedback to users, administrators, managers or any other interested groups or individuals. These software programs may reside in Memory 320 of Innovation Capacity System 214. In addition, Memory 320 may include Database Tables 322 comprising records, such as, individual preferences, previous high scores, descriptions, transaction records, etc. Also, Memory 320 may include Database Software 324 for manipulating the records of Database Tables 322. Memory 320 may also include one or more graphics modules that may take inputs and/or results that may be displayed, stored and compared graphically.

Figure 4:
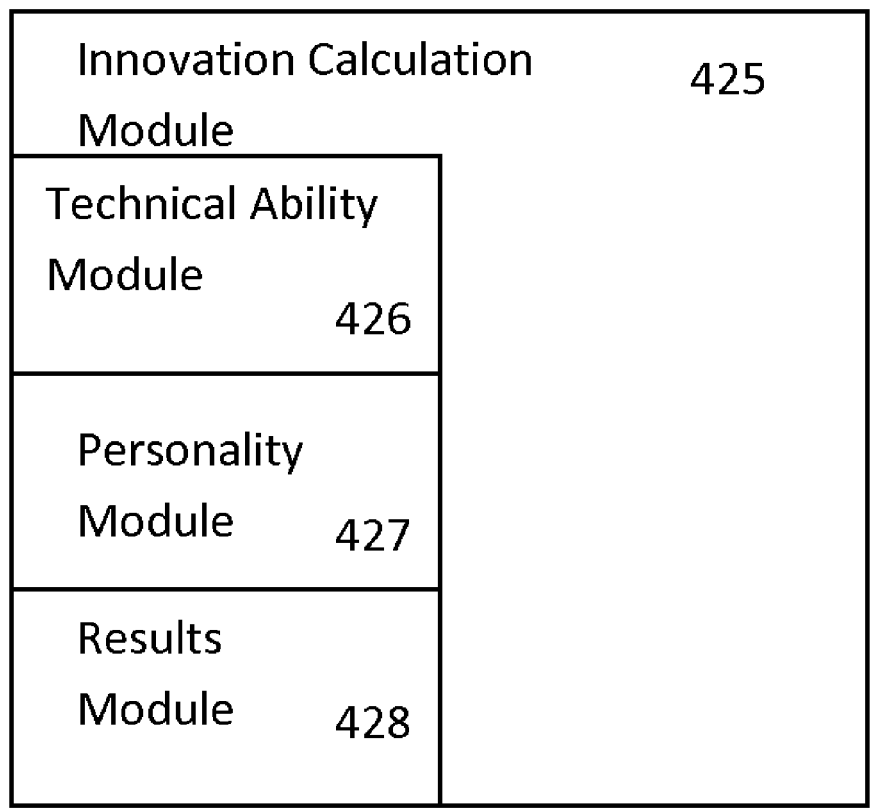
FIG. 4 illustrates an example innovation calculation module.

FIG. 4 is and illustrative example consistent with the present invention. Innovation Calculation Module 425 comprises A Technical Ability Module 426, a Personality Module 427, and a Results Module 428. This Innovation Calculation Module 425 is scalable and could contain more or fewer valuation modules. Once the question and/or answers value is derived, the resulting valuation is used to help determine placement in content. For example, Innovation Calculation Module 425, could place all highly valued questions and answers at the beginning of "The instrument". Innovation Calculation Module 425 could place low valued questions and answers at the beginning of "The instrument". Innovation Calculation Module 425 may randomly place high and low valued questions and answers throughout "The instrument". Technical Ability Module 426 may enable the valuations of the Technical Ability questions and answers. In a similar manner the Personality Module 427 may enable the valuations of the personality questions and answers. These valued questions and answers are then available for the Innovation Calculation Module 425 to place them into "The instrument". The Results Module 428 calculates the minimum and maximum results that are created as a result of the Innovation Calculation Module 425 placement of questions and answers from either or both Technical Ability Module 426, and/or Personality Module 427. The Results Module 428 may also process and store results from one or a plurality of innovation efforts and or innovation teams.

Figure 5:
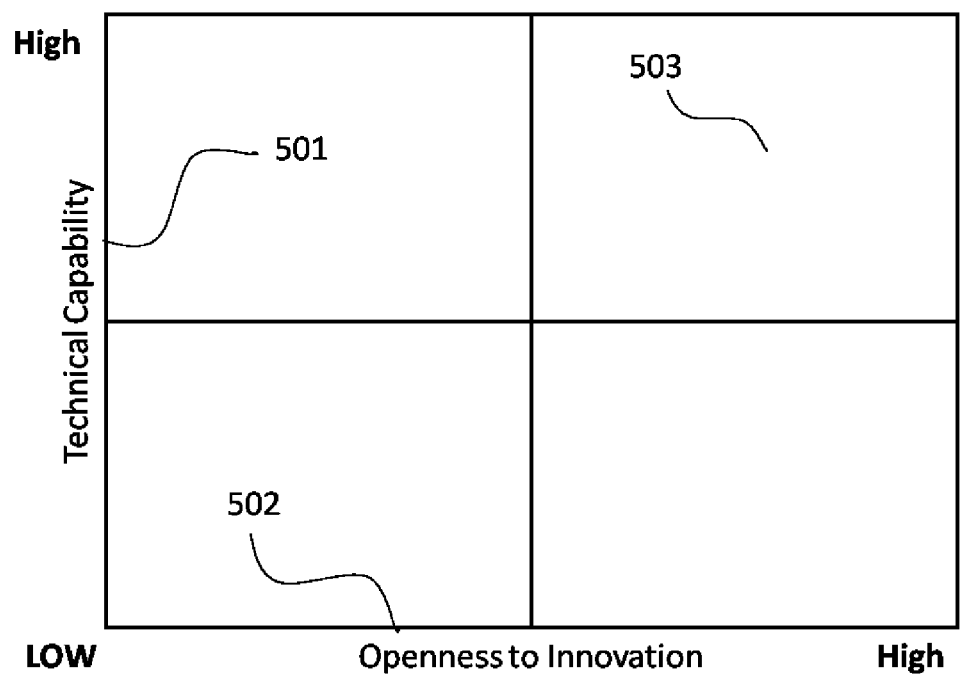
FIG. 5 illustrates an example output from a graphics module.

FIG. 5 is an illustrative example consistent with the innovation which demonstrates the base of a two axis 2 dimensional graphical display. The Y axis 501 identifies technical capability. Low technical capability is on the bottom of the Y axis. High technical capability is on the top of the Y axis. The x axis 502 identifies openness to innovation. Low openness to innovation is on the left of the x axis. High openness to innovation is on the right of the x axis. In this example, quadrant 503 would be the most optimal because may contain values for both high openness to innovation and high technical capability.

Figure 6:
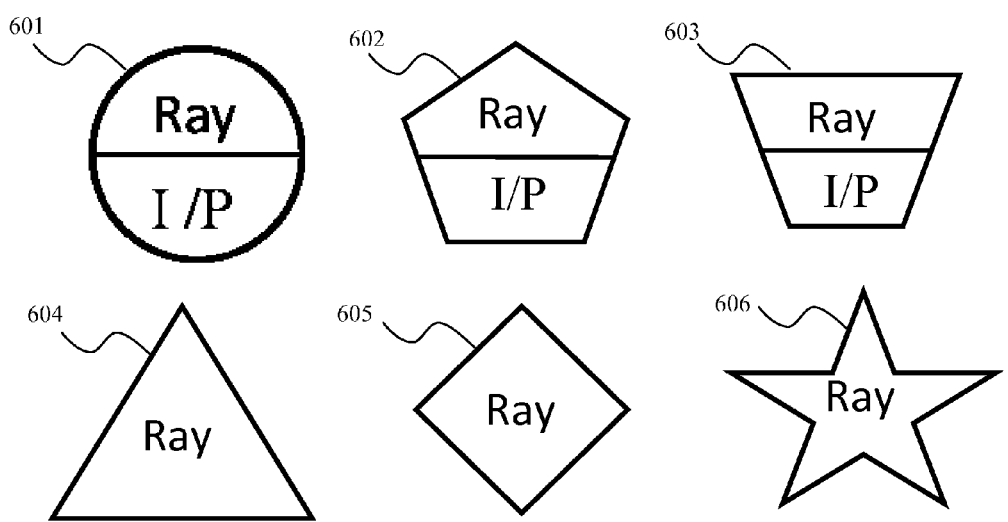
FIG. 6 illustrates examples of system created identifiers from a graphics module.

FIG. 6 is an illustrative example of possible graphical representations that may be used to indicate an individual's innovation measurement and innovation capacity determination scores. 601 is illustrative of a circular representation of an individual named Ray. The individual's name, Ray, is found above the dividing line. This helps identify the individual's results graphically. The letters "I/P" indicate that Ray's primary innovation personality measurement is an "I" which represents the "Ingenuity" profile. The second letter "P" indicates that Ray's secondary innovation personality measurement is a "P" which represents the "Power" profile. These two letters indicate that based on Ray's responses to the tailored and valued questions from "The instrument" he is most oriented toward ingenuity, and secondly toward power. This graphical representation can help the innovation capacity system user quickly identify Ray's potential strengths and weaknesses on an innovation effort. This information can also help Ray himself identify opportunities to improve his own innovative abilities by helping him understand his own potential.

602 is a graphical representation of the same information presented in 601 framed inside a graphically represented pentagon. 603 is a graphical representation of the same information presented in 601 framed inside a graphically represented keystone symbol. 604 is a graphical representation of the similar information presented in 601 framed inside a graphically represented triangle. 605 is a graphical representation of the similar information presented in 601 framed inside a graphically represented diamond. 606 is a graphical representation of the similar information presented in 601 framed inside a graphically represented star shape. One skilled in the art will realize that the graphical representation of "The instrument's" information is not limited. There are a multitude of various graphical representations that are possible, including representations in two dimensions and three dimensions.

Figure 7:
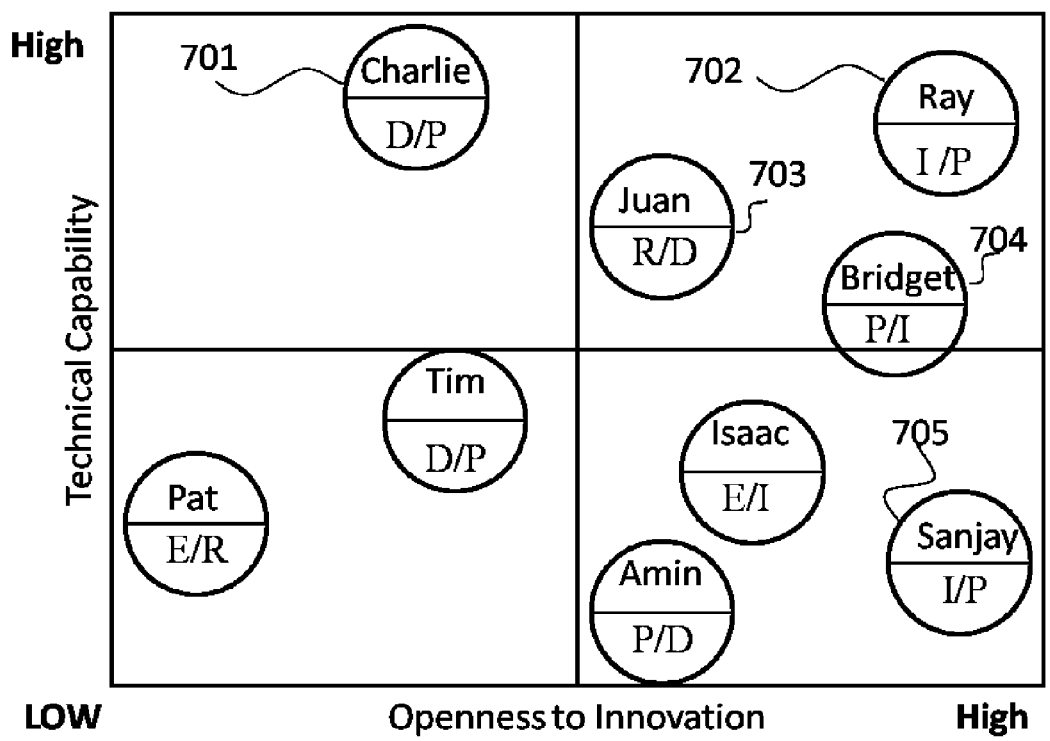
FIG. 7 illustrates an example of a comparison output from a graphics module.

FIG. 7 is an illustrative example of graphic output that may be generated by Innovation Capacity System 214 (FIG. 2). It illustrates possible graphical representations that may be used to indicate innovation capacity system scores and the relation of at least one score to another score. FIG. 7 may be used to indicate which individuals should be selected to help ensure the success of an innovation project. For example, assume in FIG. 7 that we have an innovation project that needs 3 individuals to develop innovations in the specific area of high capacity batteries. Each of the 9 individuals noted in FIG. 7 have used Innovation Capacity System 214 (FIG. 2). Each has answered tailored and valued questions designed for high capacity battery innovation capacity determination. Innovation Capacity System 214 (FIG. 2) has valued questions and answers, presented the questions to the 9 individuals, gathered the answers from the individuals, tabulated the results and prepared the results from all these inputs. The results are presented graphically in FIG. 7. The Charlie 701 icon indicates Charlie has a high technical capability with regards to high capacity batteries. But also Charlie 701 also shows that Charlie's openness to innovation is not as high as some others. The Ray 702 icon indicates that Ray has a high technical capability with regards to high capacity batteries. It also indicates that Ray has a high openness to innovation. The Juan 703 icon indicates that Juan has a relatively high technical capability with regards to high capacity batteries. Juan also has a relatively high openness to innovation. The Bridget 704 icon indicates that Bridget has a relatively high technical capability with regards to high capacity batteries. Bridget also has a relatively high openness to innovation. The Sanjay 705 icon indicates that Sanjay has a very high openness to innovation. However, Sanjay has a relatively low technical capability with regards to high capacity batteries. In this example the initial assessment would indicate that Ray, Juan, and Bridget would be the best choices for the innovation effort around high capacity batteries. One skilled in the art will recognize that the circle symbol used to represent an individual could be a star, a triangle, or any other symbol that represents the individual. In addition the additional letters under the individual's name may or may not be included on the graphical representation of the individual.

FIG. 7 give us additional information around the individual personalities of each individual. This additional information may be included on the symbol. Ray 702 as discussed in FIG. 6 has a primary innovation personality measurement which is an "I". This represents the "Ingenuity" profile. The second letter "P" indicates that Ray's secondary innovation personality measurement is a "P" which represents the "Power" profile. Juan has a primary innovation personality measurement which is an "R". This represents the "Relationship" profile. The second letter "D" indicates that Ray's secondary innovation personality measurement is a "D" which represents the "Detail" profile. Bridget has a primary innovation personality measurement which is a "P". This represents the "Power" profile. The second letter "I" indicates that Bridget's secondary innovation personality measurement is an "I" which represents the "Ingenuity" profile. Often with Innovation efforts, different profiles may complement one another. Since each potential team member's personality is different we may have more confidence that the team comprising Juan, Ray and Bridget will be able to work together to innovate.

FIG. 8 is an illustrative example of the differences between personality profiles that may help provide background for this invention. The innovation personality profiles can be easily remembered by the acronym P.R.I.D.E. All individual's innovation personalities may be described by one, or a combination of these five letters. Each letter corresponds to a descriptive word. "P" represents "Power". Individuals with "P" as a major component of their personality like quick results; they like to get things done. "R" represents "Relationships". Individuals with "R" as a major component of their personality like dealing with people; they like getting everyone to work together. "I" represents "Ingenuity". Individuals with "I" as a major component of their personality like to create or change things; they like to be known for cleverly solving problems. "D" represents "Details". Individuals with "D" as a major component of their personality like to focus on details; they like to be known for ensuring accuracy. "E" represents "Evenness". Individuals with "E" as a major component of their personality like to make sure things flow smoothly; they like to be known for ensuring team success.

Figure 9:
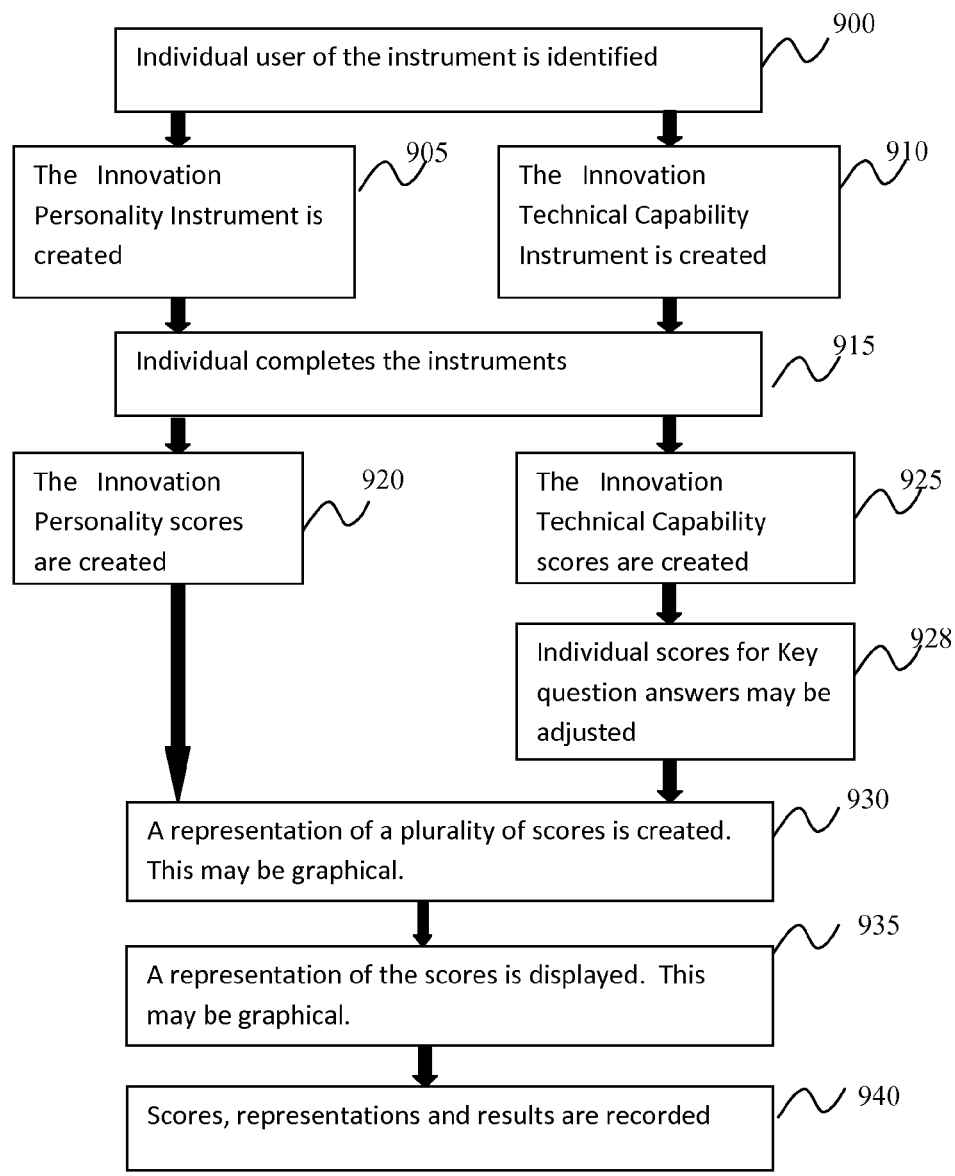
FIG. 9 illustrates an example process for creating a representative output of innovative capacity.

FIG. 9 illustrates an exemplary process for creating a tailored innovation measurement and innovation capacity determination instrument consistent with this invention. Every innovation effort undertaken may have a different instrument created for it. This process may be completed with the Innovation Capacity System 214 (FIGS. 2 & 3). The individual user is identified 900 in any number of ways. Often a management member or innovation project leader will suggest any number of potential users. Users may also volunteer themselves or be selected by others. There are no restrictions imposed on who may use the instrument by Innovation Capacity System 214 (FIGS. 2 & 3).

The innovation personality instrument 905 is created for the specific project. The innovation personality instrument 905 may be an existing instrument that was used on another project or it may be created especially for the specific project. It may be created by the Innovation Capacity System 214 (FIGS. 2 & 3). For example, the Innovation Capacity System 214 (FIGS. 2 & 3) may randomly select 25 personality questions from a list of 50 previously created questions with answers. The Innovation Capacity System 214 (FIGS. 2 & 3) may then place the questions into a medium that will allow the user to see or otherwise experience the questions and then respond to the questions using any of the appropriate input devices 300 (FIG. 3)

Technical capability is very important for innovation. Technology is continually advancing and technical capability must be monitored and enhanced in individuals to meet the needs of each new innovation project. The innovation technical capability instrument 910 is created for the specific project. The innovation technical capability instrument 910 may be comprised from one or a plurality of existing instruments that may have been used on another project. It may be created especially for the project. It may be created by the Innovation Capacity System 214 (FIGS. 2 & 3). For example, the Innovation Capacity System 214 (FIGS. 2 & 3) may randomly select 20 technical capability questions from a list of 50 previously created questions with answers. The Innovation Capacity System 214 (FIGS. 2 & 3) may then place the questions into a medium that will allow the user to see or otherwise experience the questions. The user then responds to the questions using any of the appropriate input devices 300 (FIG. 3).

Individual technical capability questions may be identified as key questions in The Innovation Capacity System 214 (FIGS. 2 & 3). If a question is identified as a key question, The Innovation Capacity System 214 (FIGS. 2 & 3) may use this identification to specially monitor and track responses to the question. A key question answer may be very important to a project's ultimate success. For example, if a company is trying to design better high capacity batteries and the most current technical data shows breakthrough are occurring in the area of nanotechnology and lithium use. A question that probes an individual's understanding of nanotechnology and lithium may be a key question. There are no maximum or minimum limits on the number of questions that can be defined as key questions.

The individual completes the instruments 915 by using an appropriate input device. The questions for instrument may be consolidated, or may be separated into a plurality of different instruments. The instruments may be completed at one time or may be completed at different times. The instruments may be completed using a single or a plurality of input devices. For example, a user may complete the technical capability component of the instrument at his work location using a desktop computer. The user may complete the personality component of the instrument using a cell phone at his home. In another example, the user may complete part of a consolidated instrument using a hand held mobile device and then finish the instrument using his television remote control as he reads questions from his home television.

The innovation personality scores 920 are created based on the responses from the user to personality based questions. The user's responses are tabulated and the user receives a score for each of 5 innovation personality component areas. The user's results are based on the P.R.I.D.E. model of personality. The user will receive a "P" score which may numerically represent the user's orientation toward "Power". The user will receive an "R" score which may numerically represent the user's orientation toward "Relationships". The user will receive an "I" score which may numerically represent the users orientation toward "Ingenuity". The user will receive a "D" score which may numerically represent the user's orientation toward "Detail". The user will receive an "E" score which may numerically represent the user's orientation toward "Evenness". An overall personality innovation orientation score is comprised of each of the P.R.I.D.E. scores.

A technical capability scores 925 based on responses from the user to technical questions. The user's responses are tabulated and the user receives at least one score for technical capability. In some cases a user may receive more than one score for technical capability. For example, if an innovation effort is particularly complex and crosses many diverse fields of study, it may be more appropriate for the Innovation Capacity System 214 (FIGS. 2 & 3) to calculate a plurality of technical capability scores for each individual.

Individual scores for key question answers may be adjusted 928. In many cases the technical capability score will not be adjusted. This is primarily because there were no key questions identified for the effort. In other cases, the Innovation Capacity System 214 (FIGS. 2 & 3) may modify results based on an individual's answer to a key question. For example, if 10 individuals use The Innovation Capacity System 214 (FIGS. 2 & 3) but only one person correctly answers a defined key question (i.e. nanotechnology and lithium), the system may modify the results in any number of ways which may include, but are not limited to; increasing the total score of the individual who answered the key question correctly, reducing scores of individuals who incorrectly answered the key question, highlighting or otherwise denoting the individual's name, who correctly answered the key question, highlighting or otherwise denoting a graphic icon representing the individual who correctly answered the question on a graphic display, preparing a type written output denoting who correctly and/or incorrectly answered the key question.

A representation of a plurality of scores is created 930 when the scores from innovation personality scores 920 and technical capability scores 925 are referenced, combined or consolidated by The Innovation Capacity System 214 (FIGS. 2 & 3). A representation may include scores from both personality scores 920 and technical capability scores 925. It may include scores from only personality scores 920 or only technical capability scores 925. The representation may consist of any plurality of scores which may include, but are not limited to, total personality score and technical capability score, total personality score and modified technical capability score, "P" personality score and technical capability score, "P" personality score and "R" personality score, "I" personality score and "D" personality score, etc. One skilled in the art will see that a representation may also be created from a plurality of combinations in addition to the combination of two scores. For example, a representation may be created from a "P" personality score, an "R" personality score, a "I" personality score and total technical score etc. These representations may be graphical.

A representation of the score is displayed 935 using a variety of multimedia networks or network devices including but not limited to: televisions, satellite and set top boxes, game consoles, cell phones, portable data access devices, email, computers, radio, and other network apparatus or appliances, display devices, network interfaces, printers, or sound or speech output devices. The representation may be displayed in a visual and/or auditory manner. The representation may be graphical and may be accompanied by text.

Scores, representations and results are recorded 940 to help ensure that data is not lost, and that it may be processed at a later date if so desired. Scores, representations and results may be recorded or stored either locally or remotely to the user's output device, in a number of media. In one embodiment scores, representations and results may be stored at a centralized location such as a content provider's facility, or some other node that is linked to the communication network. Any apparatus that is capable of storing information could be enabled to store or transport scores, representations and results. Consistent with the present invention, these scores, representations and results, may also be stored in Database Tables 322 (FIG. 3). In another embodiment, consistent with the present invention, scores, representations and results, may also be stored a portable device that the user may carry, such as a flash drive, an SD card, mini card, MMC card, RS card, Plus card, Mobile card, Smart Media device, Compact Flash device, MS device, PRO device, Duo device, PRO Duo device, a thumb drive, a cell phone, a personal digital assistant, or a personal computing device that is portable. Any apparatus that is capable of storing information could be enabled to store or transport scores, representations and results.

Figure 10:
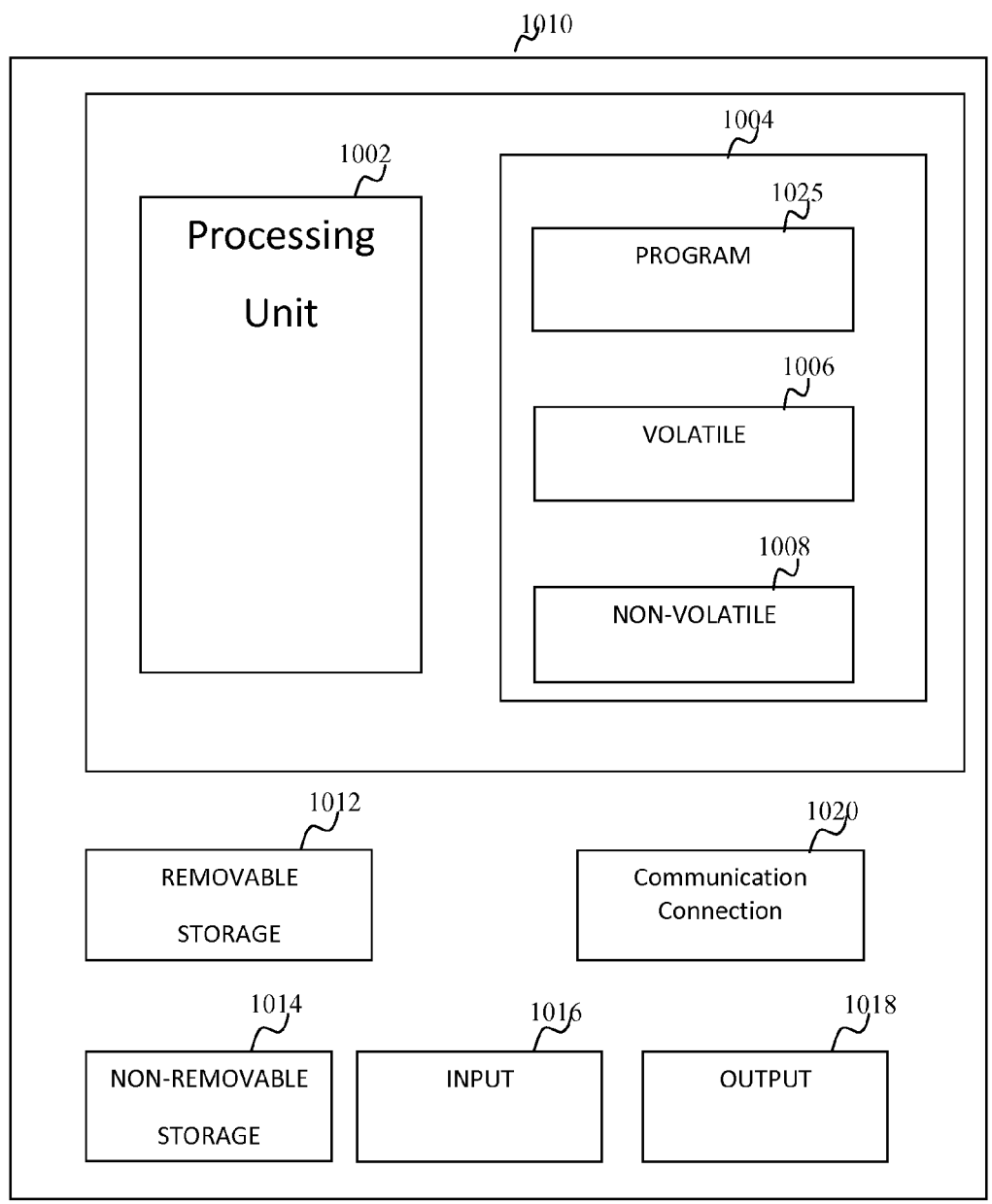
FIG. 10 is a block diagram of a computer system for executing methods of various embodiments.

A block diagram of a computer system that executes programming for performing the above algorithm is shown in FIG. 10. A general computing device in the form of a computer 1010, may include a processing unit 1002, memory 1004, removable storage 1012, and non-removable storage 1014. Memory 1004 may include volatile memory 1006 and non-volatile memory 1008. Computer 1010 may include—or have access to a computing environment that includes—a variety of computer-readable media, such as volatile memory 1006 and non-volatile memory 1008, removable storage 1012 and non-removable storage 1014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1010 may include or have access to a computing environment that includes input 1016, output 1018, and a communication connection 1020. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1002 of the computer 1010. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

I claim:

1. A system for identifying and evaluating innovative abilities, the system comprising:
   an input apparatus to facilitate identification and recording of preferences, answers and responses from at least one user relating to content comprising at least one technical capability testing instrument, and at least one innovation personality instrument for at least one innovation effort;
   a presentation device to display content, wherein said content comprises one or more questions;
   a content provider device using at least one processor to distribute and receive content to the system comprising the at least one technical capability testing instrument and the at least one innovation personality instrument, wherein each potential answer for each question contains a distinct value, wherein the at least one technical capability testing instrument comprises a plurality of technical questions and at least one key question for the at least one innovation effort, wherein the at least one key question answer modifies scores for the at least one innovation effort when a particular condition is satisfied, and the at least one innovation personality instrument is tailored to the at least one user, wherein the at least one innovation personality instrument identifies current overall openness to innovation and specific components of innovation personality to determine the overall innovation capacity of the at least one user;
   an innovation capacity system using the at least one processor that gathers:
   (i) the at least one user's answer to at least one question on the at least one innovation personality instrument for the at least one innovation effort, and
   (ii) the at least one user's answer to the at least one question on the at least one technical capability testing instrument for the at least one innovation effort,
   wherein the at least one user's answers are gathered at different points of time and from a plurality of input devices, wherein the time required for the at least one user's answers is not gathered or recorded, wherein the innovation capacity system calculates:
   (i) the current openness to innovation and specific components of innovation personality of the at least one user from a plurality of the at least one user's answers on the at least one innovation personality instrument, and (ii) technical capability of the at least one user from the plurality of the at least one user's answers to the at least one technical capability testing instrument including the at least one key question for the at least one innovation effort, wherein the at least one key question answer of the at least one user modifies score of the at least one user or of other users for the at least one innovation effort when the particular condition is satisfied, wherein the innovation capacity system calculates the innovation capacity of the at least one user based on openness to innovation and the technical capability of the at least one user for the at least one innovation effort, and displays the innovation capacity of the at least one user at the presentation device.

2. A computer executed method for determining more than one component of innovation capacity and propensity to be innovative of at least one user, via the use of:
  (i) at least one technical capability instrument and,
  (ii) at least one innovation personality instrument for at least one innovation effort, the method comprising:
  identifying at least one user using a computer system with at least one processor for determining openness to innovation and technical capability of the at least one user for the at least one innovation effort via the at least one user's direct input;
  tailoring the at least one technical capability testing instrument for the at least one user via the computer system, wherein the at least one technical capability testing instrument comprises a plurality of technical questions and one or more potential answers, wherein each potential answer for each of the plurality of technical question contains a distinct value, wherein at least one of the plurality of technical questions is designated as a key question, wherein the key question modifies a score when a particular condition is satisfied;
  tailoring the at least one innovation personality instrument for the at least one user, to identify current overall openness to innovation and specific components of innovation personality of the at least one user using the computer system with the at least one processor, wherein the at least one innovation personality instrument comprises one or more questions;
  presenting the at least one technical capability testing instrument to the at least one user via the computer system;
  presenting the at least one innovation personality instrument to the at least one user via the computer system;
  recording, via the computer system, the at least one user's directly inputted answer or answers to:
    (i) at least one question from the at least one technical capability testing instrument and
    (ii) at least one question from the at least one innovation personality instrument,
  wherein the at least one user's answers are gathered at different points of time and from at least one of a plurality of input devices, wherein the time required for the at least one user's answers is not gathered or recorded;
  calculating a plurality of innovation capacity scores including the current overall openness to innovation and specific components of innovation personality of the at least one user from:
    (i) a plurality of the at least one user's answers to the at least one technical capability testing instrument and
    (ii) a plurality of the at least one user's answers to the at least one innovation personality instrument using the computer system;
  modifying the at least one user's innovation capacity scores as a result of the at least one user's answer to the at least one key question when said particular condition is satisfied, using the computer system, such that the at least one answer modifies plurality of scores for the at least one innovation effort;
  displaying the at least one user's innovation capacity scores using the computer system; and
  storing the plurality of the at least one user's innovation capacity scores on a storage device such that the scores are accessible to the user and other users.

3. The computer executed method of claim 2 wherein the at least one user's innovation capacity scores represent the individual's orientation toward Power which is used to create at least one optimal innovation team.

4. The computer executed method of claim 2 wherein the at least one user's innovation capacity scores represent the individual's orientation toward Relationships which is used to create at least one optimal innovation team.

5. The computer executed method of claim 2 wherein the at least one user's innovation capacity scores represent the individual's orientation toward Ingenuity which is used to create at least one optimal innovation team.

6. The computer executed method of claim 2 wherein the at least one user's innovation capacity scores represent the individual's orientation toward Details which is used to create at least one optimal innovation team.

7. The computer executed method of claim 2 wherein the at least one user's innovation capacity scores represent the individual's orientation toward Evenness which is used to create at least one optimal innovation team.

8. The computer executed method of claim 2 wherein the at least one user's innovation capacity scores represent the individual's orientation toward innovation.

9. The computer executed method of claim 2 wherein the at least one user's innovation capacity scores represent the individual's technical capability.

10. The computer executed method of claim 2 wherein the display of the at least one user's innovation capacity scores is represented graphically.

11. The computer executed method of claim 2 wherein the display of the at least one user's innovation capacity scores contains the individual's name.

12. The computer executed method of claim 2 wherein the display of the at least one user's innovation capacity scores contains the individual's name and additional information.

13. The computer executed method of claim 2 wherein the at least one user's plurality of innovation capacity scores are stored on a storage device locally on a device inside the user's system.

14. The computer executed method of claim 2 wherein the at least one user's plurality of innovation capacity scores are stored remotely on a device outside of the user's system.

15. The computer executed method of claim 2 wherein the at least one user's innovation capacity scores are used to determine team membership of the at least one innovation effort.

* * * * *